United States Patent [19]
May

[11] Patent Number: 5,706,251
[45] Date of Patent: Jan. 6, 1998

[54] SCUBA DIVING VOICE AND COMMUNICATION SYSTEM USING BONE CONDUCTED SOUND

[75] Inventor: David F. May, Columbus, Ind.

[73] Assignee: Trigger Scuba, Inc., Columbus, Ind.

[21] Appl. No.: 755,490

[22] Filed: Nov. 22, 1996

Related U.S. Application Data

[63] Continuation-in-part of Ser. No. 541,826, Oct. 10, 1995, Pat. No. 5,579,284. Related U.S. Application Data

[60] Provisional application No. 60/011,345, Jul. 21, 1995.

[51] Int. Cl.$^6$ ................................................ H04B 11/00
[52] U.S. Cl. ........................................ 367/132; 340/850
[58] Field of Search ................................ 367/131, 132; 340/850

[56] References Cited

U.S. PATENT DOCUMENTS

| | | | |
|---|---|---|---|
| 3,789,353 | 1/1974 | Hinter et al. | 340/5 T |
| 3,819,860 | 6/1974 | Miller | 179/1 P |
| 4,071,110 | 1/1978 | Payne | 181/127 |
| 4,232,194 | 11/1980 | Adams | 179/1.5 R |
| 4,791,673 | 12/1988 | Schreiber | 381/151 |
| 5,031,611 | 7/1991 | Moles | 128/201.11 |
| 5,033,999 | 7/1991 | Mersky | 600/25 |
| 5,136,555 | 8/1992 | Gardos | 367/132 |
| 5,185,605 | 2/1993 | Roberts, Jr. et al. | 340/850 |
| 5,305,741 | 4/1994 | Moles | 128/207.14 |
| 5,455,842 | 10/1995 | Mersky et al. | 375/175 |
| 5,579,284 | 11/1996 | May | 367/132 |

FOREIGN PATENT DOCUMENTS

| PCT/FR90/ 00615 | 3/1991 | France | B63C 11/26 |
|---|---|---|---|

*Primary Examiner*—Ian J. Lobo
*Attorney, Agent, or Firm*—Taylor & Associates, P.C.

[57] ABSTRACT

The invention is directed to a scuba diving mouthpiece for supplying air to a diver. The mouthpiece includes a mouth engageable body having at least one biteplate. Each biteplate is adapted for being disposed between and engaged by the teeth of the diver. A sound transducer is associated with the body, and includes a magnetostrictive element with opposing ends. The magnetostrictive element is expandable and contractible in an axial direction in a presence of a magnetic field. A sound conducting member includes a movable distal end and an opposing fixed end. The sound conducting member is operatively connected with one of the ends of the magnetostrictive element at a location between the distal end and the fixed end. The sound conducting member is embedded within the body and configured to receive audio sounds from the connected sound transducer. The sound conducting member is also configured to transmit audio sounds through at least one of the biteplates, whereby the audio sounds may be conducted to the teeth of the diver.

12 Claims, 9 Drawing Sheets

SCUBA DIVING VOICE AND COMMUNICATION SYSTEM USING BONE CONDUCTED SOUND

CROSS REFERENCE TO RELATED APPLICATIONS

This is a continuation-in-part of U.S. patent application Ser. No. 08/541,826, filed Oct. 10, 1995, now U.S. Pat. 5,579,284 entitled "SCUBA DIVING VOICE AND COMMUNICATION SYSTEM USING BONE CONDUCTED SOUND", which is a non-provisional U.S. patent application based upon provisional U.S. patent application Ser. No. 60/011,345, filed Jul. 21, 1995, entitled "SCUBA DIVING VOICE AND COMMUNICATION SYSTEM USING BONE CONDUCTED SOUND".

BACKGROUND OF THE INVENTION

1. Field of the Invention

The present invention relates to audio communication systems, and, more specifically, to underwater audio communication systems.

2. Description of the Related Art

Most modern personal audio communication systems do not use bone conduction for sound transmission to the ear. Instead, sound is transmitted by air conduction to the ear canal where it is subsequently conducted through the middle ear to the cochlea where these vibrations are interpreted in the brain as sound. Examples of these systems are many from hand held 2 way radios, to FM and AM radios, to short and long wave radio communication systems. All of these rely on air conducted sound for the listener and speaker.

Several disadvantages of this type of system are found for underwater swimming. First, in order to facilitate an air gap between the ear and the sound source, it is necessary to provide a mask with an apparatus over the ears or a helmet covering the entire head. Some systems provide sound directly to the ear by placing a sound source against the outside of the outer ear. This has been the conventional approach for several years. While this approach is effective and provides for communication, this system is very expensive, cumbersome to use, is uncomfortable, requires special training for use, and provides poor sound quality. Further, such a system introduces a process and equipment which is very different from conventional scuba diving equipment, whereby in the case of an underwater loss of air, a buddy assistance measure requiring sharing of air is ineffective.

The helmet or full face hood currently used for communication is also more dangerous to the user in the event that water enters the air gap space in the hood because it is more difficult to clear the water from the intended air space due to the increased air volume and sealing surface than a normal mask which only covers the eyes and nose. A user's ability to obtain air for breathing also is impaired if problems occur with the full face hood, making it more dangerous than normal scuba diving gear.

Commercial units which rely on air conduction or direct ear contact sound transmission are currently available. Brand names and constructions are differentiated primarily on the type of sonar carrier, frequency of transmission, power, type of transmission send switch, transducer types and headgear configurations. This type of diving apparatus is shown in U.S. Pat. No. 3,789,353 to Hunter.

Examples of conventional audio listening systems without headphones are shown in U.S. Pat. No. 4,589,134 to Waldron for a sound system enclosed in a vest meant to be worn by the listener; U.S. Pat. No. 4,070,553 to Hass, for a scarf-tube enclosing a sound source meant to be worn around the listener's neck; U.S. Pat. No. 3,869,584 to Wilde, covering a device enclosing the ears of the individual listener; and U.S. Pat. No. 3,868,572 to Kaufman, representative of personal audio devices worn inside the ear of the individual listener.

Conventional bone conduction audio devices are typically hearing aids for the hearing impaired. Examples of such bone conduction hearing aids are disclosed in U.S. Pat. No. 2,230,500 to Lybarger; U.S. Pat. No. 2,258,638 to Zarth; and West German Patent No. 2451977 to Breckwoldt. Most modern bone conduction hearing aids include the ability to implant the bone conduction oscillator beneath the listener's skin in direct contact with the mastoid bone.

Particular to tooth oscillated bone conduction is U.S. Pat. No. 5,033,999 to Mersky, which is representative of a method and apparatus for endodontically augmenting hearing by the direct encapsulation of an audio transducer inside a tooth.

What is needed in the art is an underwater communication system which provides effective one-way or two-way communication with a diver, and which does not include the inherent problems associated with conventional systems using air conduction to transmit the sound waves through the ear canal.

SUMMARY OF THE INVENTION

The present invention provides a communication system using bone conduction for sound transmission to the ear by means of audible frequency transducers molded into a mouthpiece. The mouthpiece allows the user to hear voice or other communication sounds with clarity. Additionally, the mouthpiece converts spoken sounds to electrical signals such that those sounds can be subsequently transmitted. Aside from providing sound for hearing and voice reception, the mouthpiece functions the same as a currently commercially available scuba diving mouthpiece which is attached to a second stage scuba diving regulator and used for breathing.

The invention comprises, in one form thereof, a scuba diving mouthpiece for supplying air to a diver. The mouthpiece includes a mouth engageable body having at least one biteplate. Each biteplate is adapted for being disposed between and engaged by the teeth of the diver. A sound transducer is associated with the body, and includes a magnetostrictive element with opposing ends. The magnetostrictive element is expandable and contractible in an axial direction in a presence of a magnetic field. A sound conducting member includes a movable distal end and an opposing fixed end. The sound conducting member is operatively connected with one of the ends of the magnetostrictive element at a location between the distal end and the fixed end. The sound conducting member is embedded within the body and configured to receive audio sounds from the connected sound transducer. The sound conducting member is also configured to transmit audio sounds through at least one of the biteplates, whereby the audio sounds may be conducted to the teeth of the diver.

The present invention provides an underwater communications system based on oral bone conducted sound through a scuba diving mouthpiece. It both receives spoken sounds for subsequent transmission and receives sounds from an amplifier source to be transmitted to the user's cochlea through bone conducted sound. No additional head gear or ancillary tubes, tethers, or attachments are required, thus creating a scuba diving device very similar to that with which all scuba divers are trained.

The present invention is easily and economically manufactured, easy to operate, and easily maintained. The present invention reduces problems which are inherent in commercially available underwater communications systems. By receiving sounds with bone conduction through a mouthpiece, a user is not required to wear any additional head straps. With current underwater communication systems, the full face mask, earphone, straps on the device which covers the mouth, or other pieces of equipment added to the scuba diver may become entangled. Problems can lead to a mask flooding condition, mask removal condition, or loss of air supply from a second stage regulator torn from the mouth. If the full face mask becomes flooded, it is very difficult or impossible for the scuba diver to clear the water from the hood while underwater due to the large volume of space inside the hood. In a situation where a scuba diver runs out of air and needs to buddy breath, buddy breathing is either nearly or totally impossible with currently commercially available systems. Because the present invention does not use a full face mask or hood, these problems inherent in conventional underwater communication systems are overcome.

An advantage of the present invention is that an underwater communications system is provided which operates by means of sound transducers molded into a mouthpiece, similar in construction to that which is normally utilized by scuba divers for underwater breathing.

Another advantage is that the underwater communication system of the present invention provides a system with better sound quality to the user by means of bone conducted sound from a mouthpiece to the cochlea.

Yet another advantage is that the underwater communication system of the present invention provides an underwater communications system with minimal additional equipment to a scuba diver.

Still another advantage is that the underwater communication system of the present invention provides a mouthpiece which may be optimized in construction to allow the user to speak as intelligibly as possible while wearing the mouthpiece.

A further advantage is that the underwater communication system of the present invention provides an underwater communications system using bone conducted sound through a mouthpiece which can be customized to the individual user for improved sound quality transmission by enhanced tooth to mouthpiece contact.

A still further advantage is that the underwater communication system of the present invention uses bone conducted sound through a mouthpiece which can utilize different user selectable channels so that more than one system can be used in the same area without imposing sound transmissions on those not intended to receive the transmission.

An additional advantage is that the sound transducers can be constructed to be inserted into a currently commercially available mouthpiece to transmit sound through the mouthpiece into the cochlea.

Another advantage is that the underwater communication system of the present invention may provide stereophonic output through independent transducers on each side of the mouth for directional location of underwater objects.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
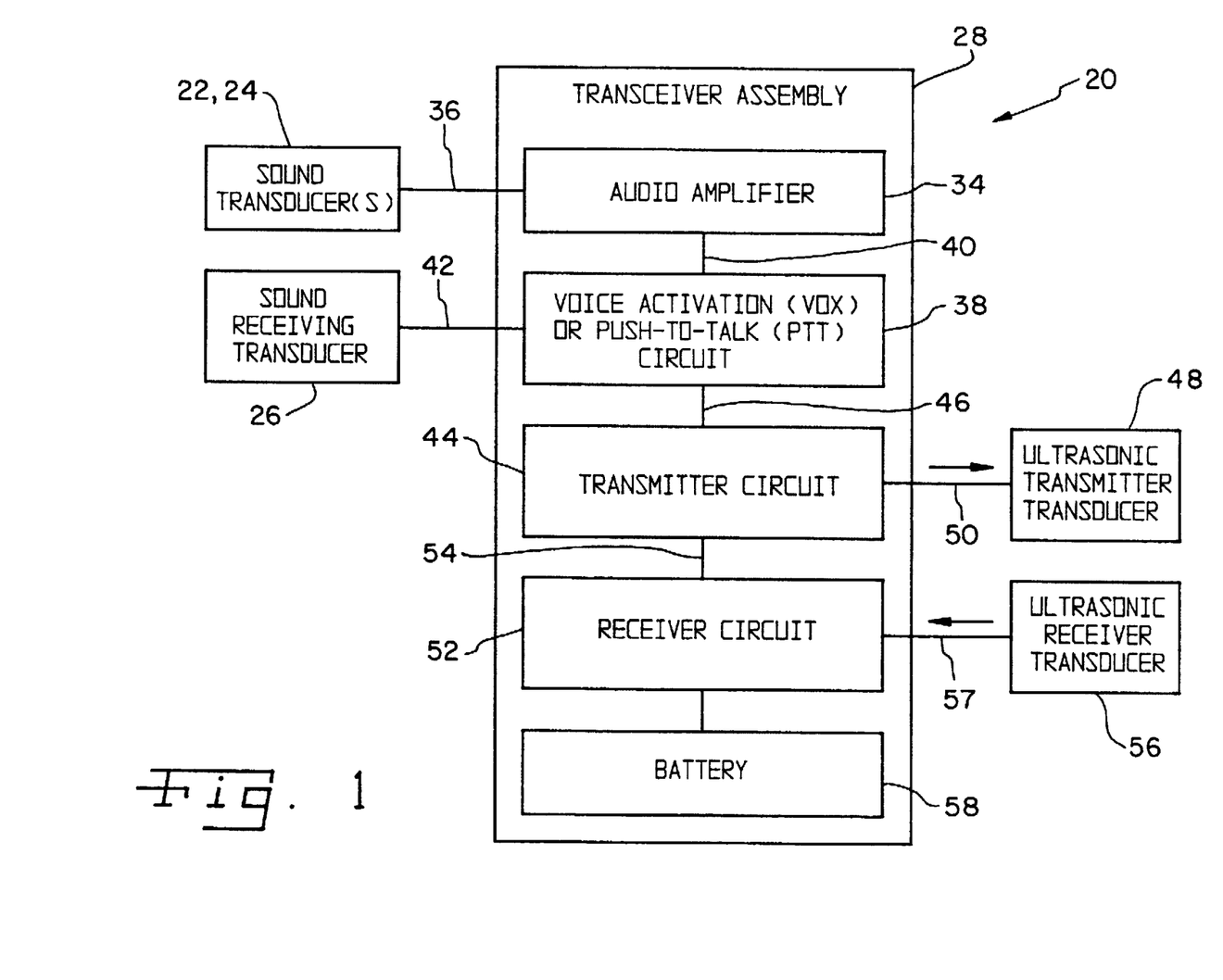
FIG. 1 is a schematic illustration of one embodiment of an underwater sound communication system of the present invention.

Referring now to the drawings, and more particularly to FIG. 1, there is shown a schematic illustration of an embodiment of an underwater sound communication system 20 of the present invention. Communication system 20 generally includes sound transducers 22, 24, sound receiving transducer 26, transceiver assembly 28, ultrasonic transmitter transducer 48, and ultrasonic receiver transducer 56.

Sound transducers 22, 24 are sound production devices of one or more types, but generally that of voice coil design, magnetostrictive transducer, piezoelectric transducer, or electrostatic transducer design. Sound transducers 22, 24 are capable of receiving and/or transmitting audio sound, and are capable of effecting vibrations in the approximate frequency range of 100 to 10,000 Hz. Sound transducers 22, 24 which have been found to operate satisfactory with the present invention are a model No. DMT-11RP-A transducer manufactured by RDI Electronics. Generally, sound transducers 22, 24 are capable of operating with a peak power of less than 2 watts but nominally at less than 1 watt.

Sound receiving transducer 26 may include one or more transducers of various types, but preferably is that of a waterproof, sealed cartridge microphone. An example of a microphone 26 which has been found to operate satisfactorily with the present invention is model No. EM 6BN, manufactured by RDI Electronics.

Transceiver assembly 28 houses the electronic circuitry necessary for the transmission, reception, amplification, modulation of transmitted information, demodulation of received information, and including a power supply, channel switch, power switch, audio volume and voice actuated transmission switch. Transceiver assembly 28 may be in the form of a printed circuit board, application specific integrated circuit (ASIC), programmable chip, or other electronic processing unit.

More particularly, and with reference to the embodiment shown in FIG. 1, transceiver assembly 28 includes an audio amplifier 34 which is connected to sound transducers 22, 24 via line 36. In the event that sound transducers 22, 24 are used to receive sound (rather than transmit sound), an amplifier 34 amplifies the signals received from sound transducers 22, 24 prior to transmitting the same to voice activation (VOX) or push-to-talk (PTT) circuit 38 via line 40. VOX or PTT circuit 38 is also connected to sound receiving transducer 26 via line 42. As would be obvious to one skilled in the art, VOX circuit 38 as it is connected to the input from sound transducers 22, 24 and/or sound receiving transducer 26 is actuated by the human voice (VOX).

A transmitter circuit 44 (to be described in more detail hereinafter) is connected to VOX of PTT circuit 38 via line 46. Transmitter circuit 44 is tuned for modulation at a desired ultrasonic frequency and is user selectable using a channel selector (not shown). Transmitter circuit 44 provides an output signal to ultrasonic transmitter transducer 48 via line 50.

A receiver circuit 52 is connected to sound transducers 22, 24 through audio amplifier 34 and via lines 54, 46 and 40. That is, signals which are output from receiver circuit 52 may simply bypass transmitter circuit 44 and VOX or PTT circuit 38. Receiver circuit 52 receives signals from an ultrasonic receiver transducer 56 via line 57.

Ultrasonic transmitter transducer 48 and ultrasonic receiver transducer 56 are respectively capable of transmitting and receiving ultrasonic sound through the water medium. Ultrasonic transmitter transducer 48 and ultrasonic receiver transducer 56 are each sealed, waterproof, and mounted in such a way to facilitate effective and substantially unimpaired transmission and reception of ultrasonic communications through the water medium. Ultrasonic transmitter transducer 48 and ultrasonic receiver transducer 56 are shown in the embodiment of FIG. 1 as being separate from transceiver assembly 28. However, it will be appreciated by those skilled in the art that ultrasonic transmitter transducer 48 and ultrasonic receiver transducer 56 may be easily incorporated into transceiver 28. Transceiver assembly 28 is therefore defined as optionally including ultrasonic transmitter transducer 48 and ultrasonic receiver transducer 56 as a part thereof. In the event that ultrasonic transducers 48, 56 are disposed away from transceiver assembly 28, wires 50, 57 are routed to the back of the scuba vest or to another location where ultrasonic transducers 48, 56 are located. The location of ultrasonic transducers 48, 56 are user selectable depending on preference, provided that there is a substantially unobstructed path for transmission and reception.

Transceiver assembly 28 also includes a power supply which may be in the form of a battery 58. Battery 58 supplies power to each of the electronic components housed within or connected to transceiver assembly 28.

Transceiver assembly 28, including ultrasonic transmitter transducer 48 and ultrasonic receiver transducer 56, is configured to send and receive audio signals to sound transducers 22, 24 and sound receiving transducer 26, as well as send and receive ultrasonic sounds through ultrasonic transmitter transducer 48 and ultrasonic receiver transducer 56, as will be described in more detail hereinafter. In addition to processing audio and ultrasonic signals in a particular fashion to be described, transceiver assembly 28 can also be configured to send and/or receive ultrasonic signals to and from commercially available underwater communication systems. For example, transceiver assembly 28 can be configured to send and/or receive single, side band frequency ultrasonic signals (with or without a carrier) which are compatible with commercially available underwater communication systems.

Figure 2:
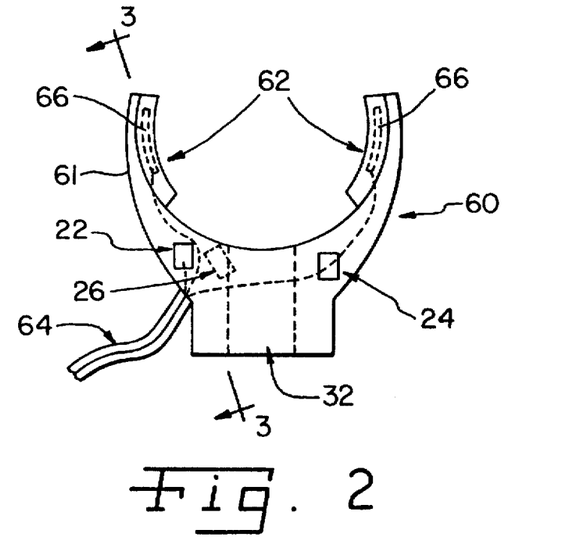
FIG. 2 is a top view illustrating one embodiment of the scuba diving mouthpiece of the present invention.
Figure 3:
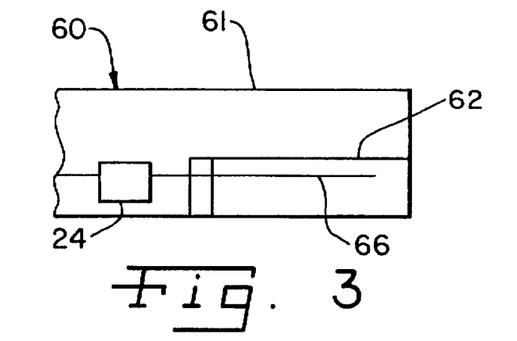
FIG. 3 is a fragmentary, sectional view taken along line 3—3 in FIG. 2.

Referring now to FIGS. 2 and 3, an embodiment of a scuba diving mouthpiece 60 of the present invention is shown. Mouthpiece 60 has an exterior shape which is similar to that of a conventional scuba diving mouthpiece. Molded of polysilicone, silicone rubber, natural rubber, polyvinylacetate-copolymer polyethylene, or any other compliable plastic or rubber or any combination thereof, mouthpiece 60 is designed to fit most if not all conventional scuba second stage regulators. The shape of mouthpiece 60 is similar to conventional mouthpieces and provides identical performance as conventional mouthpieces with respect to those criteria associated with normal underwater breathing and securing of the second stage regulator to the user.

Mouthpiece 60 provides the diver with a mouthpiece which looks and feels very similar to a conventional mouthpiece, thus eliminating the need for special training or skills for the use thereof. Therefore, the molding of the mouthpiece is carried out in such a fashion to render a finished product which looks and feels similar to a conventional mouthpiece. The only visible difference is a slightly differently shaped biteplate and a wiring bundle 64 which emerges from the bottom right hand side (relative to the user, but could be located at any desirable location) near the connection to the second stage regulator, and rod shaped protrusions from the front of the mouthpiece near the regulator. Wire bundle 64 is maintained in tight contact with the second stage pressurized air conduit tube using one or more types of wound material either adhesively or mechanically bound. The result of this is a second stage regulator which looks, feels and operates like a conventional system. While similar in appearance, feel and breathing operation to a conventional mouthpiece, the present invention provides sound with sufficient amplitude and clarity for the diver to hear sound with the same clarity that the diver would in air.

Molded into body 61 of mouthpiece 60, near biteplate 62, are sound transducers 22, 24, one in each side. Generally, transducers 22, 24 are capable of operating with a peak power of less than 2 watts but nominally at less than 1 watt. Sound transducers 22, 24 are configured and tuned to provide optimum effectiveness at the desired frequency bandwidth. Sound transducers 22, 24 are each connected to a wire bundle 64 (illustrated schematically as line 36 in FIG. 1). Sound transducers 22, 24 are also connected to respective sound conducting members 66 which are preferably in the form of metal, sound conducting strips of material 66. However, sound conducting members 66 can also be made from plastic, ceramic, or other suitable material. Sound conducting members 66 are disposed within biteplate 62. Acceptable sound levels have been obtained using sound transducers 22, 24 which are connected to sound conducting members 66, as shown in FIG. 2. Sound conducting members 66 function to transmit sound generated by sound transducers 22, 24 through the mouthpiece and into biteplates 62 which are close to the maxillary and mandibular teeth of the diver.

Figure 4:
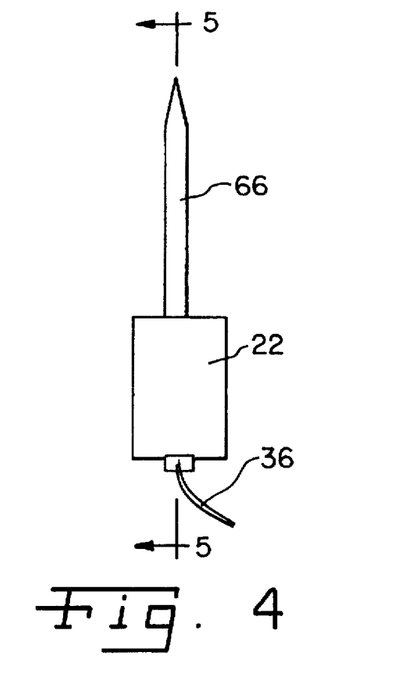
FIG. 4 is an enlarged, plan view of an embodiment of the sound transducer and sound conductor of the present invention.
Figure 5:
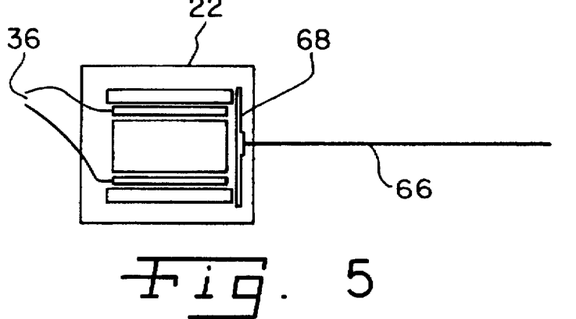
FIG. 5 is a sectional view taken along line 5—5 in FIG. 4.

Referring now to FIGS. 4 and 5, details of sound transducer 22 connected to sound conducting member 66 are shown. It is to be understood that sound transducer 24 is similar in construction to sound transducer 22. Sound transducer 22 may be molded into mouthpiece 60, or may be configured to be inserted into a commercially available scuba mouthpiece. Sound transducer 22 includes a wire 36 forming a wire bundle 64 (FIG. 2) which is in communication with transceiver assembly 28. Sound transducer 22 has a diaphragm 68 (FIG. 5) therein. In the embodiment shown, diaphragm 68 is a thin, metallic diaphragm, to which sound conducting member 66 is directly attached. For example, sound conducting member 66 may be attached to diaphragm 68 via an adhesive, weld or other suitable attachment device. Sound vibrations in diaphragm 68 in turn cause sound vibrations in sound conducting member 66.

U-shaped mouthpiece 60 is molded or otherwise configured such that transducers 22, 24 are sealed and waterproof. The biteplate 62 may or may not be constructed with a differing material from the remainder of mouthpiece 60. In one embodiment of the invention, biteplate 62 is constructed from a material having a higher modulus of elasticity thereby providing optimum sound conduction from sound transducers 22, 24 to the teeth. The selection of this material is made to provide an optimization of sound fidelity while providing maximum comfort to the diver.

Mouthpiece 60 can be constructed having a monolithic or laminated construction. For example, mouthpiece 60 can include laminated layers of hard and soft rubber, plastic, or silicone materials forming the biteplate. Moreover, mouthpiece 60 can be constructed from a material that is customizable for one person's mouth. A customizable mouthpiece acts to transfer sound with increased fidelity because of the increased surface contact between the teeth and biteplate 28. Mouthpiece 60 can also be constructed such that it is not user customized. A non-customizable mouthpiece could be purchased by a scuba diving instructor for use in a teaching situation or other multi-user intended applications.

Figure 6:
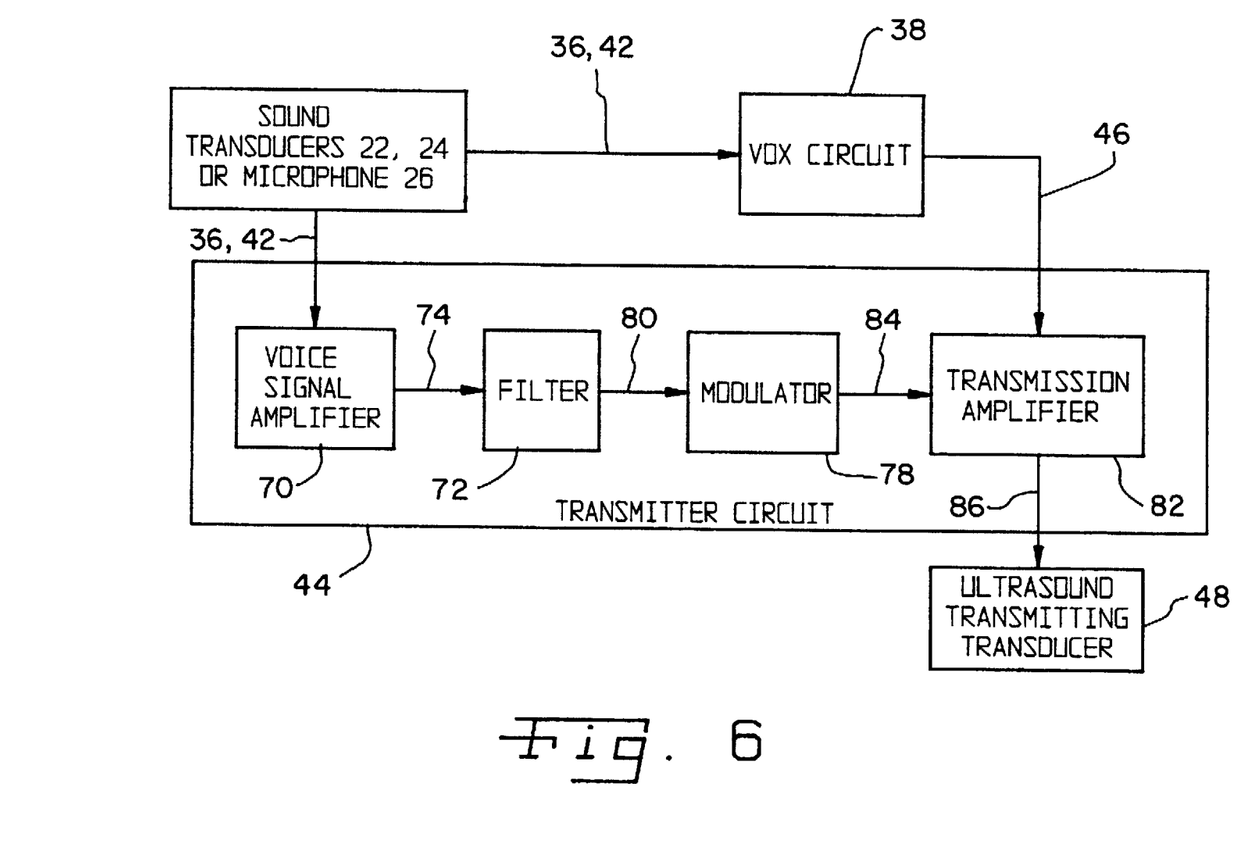
FIG. 6 is a schematic illustration detailing the transmitter circuit shown in FIG. 1.

Referring now to FIG. 6, details of transmitter circuit 44 (FIG. 1) are shown. A voice signal originating from a sound transducer 22, 24, a microphone 26 or other sound source is simultaneously transmitted to a voice signal amplifier 70 and VOX circuit 38 via lines 36, 42. A filter 72 receives the amplified signals from voice signal amplifier 70 via line 74 and may include, e.g., band pass filters which provide discrimination against inherent noise associated with scuba diving. Filter 72 includes components normally used in audio crossover circuits, and is generally in the form of a low pass filter with an approximate 3,000 Hz cutoff. Noises from breathing, bubbles, movement and ancillary noises can thus be canceled using filter 72. A modulator 78 is connected to filter 72 via line 80 and receives signals therefrom. Modulator 78 functions to superimpose the voice signal on a higher frequency carrier. Based upon an amplitude modulated signal around the principal frequency, modulator 78 outputs signals via line 84 to transmission amplifier 82. Transmission amplifier 82 functions to increase the signal power to a level necessary for transmission. Transmission amplifier 82 also receives signals from VOX circuit 38 via line 46, such that transmission amplifier 82 is switched to an ON state during a time that a diver speaks, and to an OFF state when the diver is not speaking. Transmission amplifier 82 then outputs signals via line 86 to ultrasonic transmitting transducer 48 for transmission of ultrasonic sound through the water medium.

VOX circuit 38 (FIG. 6) may incorporate a memory buffering system (not shown) which stores spoken sounds for approximately 200 milliseconds and subsequently reproduces those sounds to transmitter circuit 44. Such a buffering system operates on a first in, first out format, thus acting as a sound delay. The buffered output is transmitted to amplifier 70 (FIG. 6) such that delays normally witnessed with the use of VOX transmitters will not be noticed. Thus, signals with truncated front ends will be avoided thereby adding to the clarity and quality of the transmitted sounds.

Figure 7:
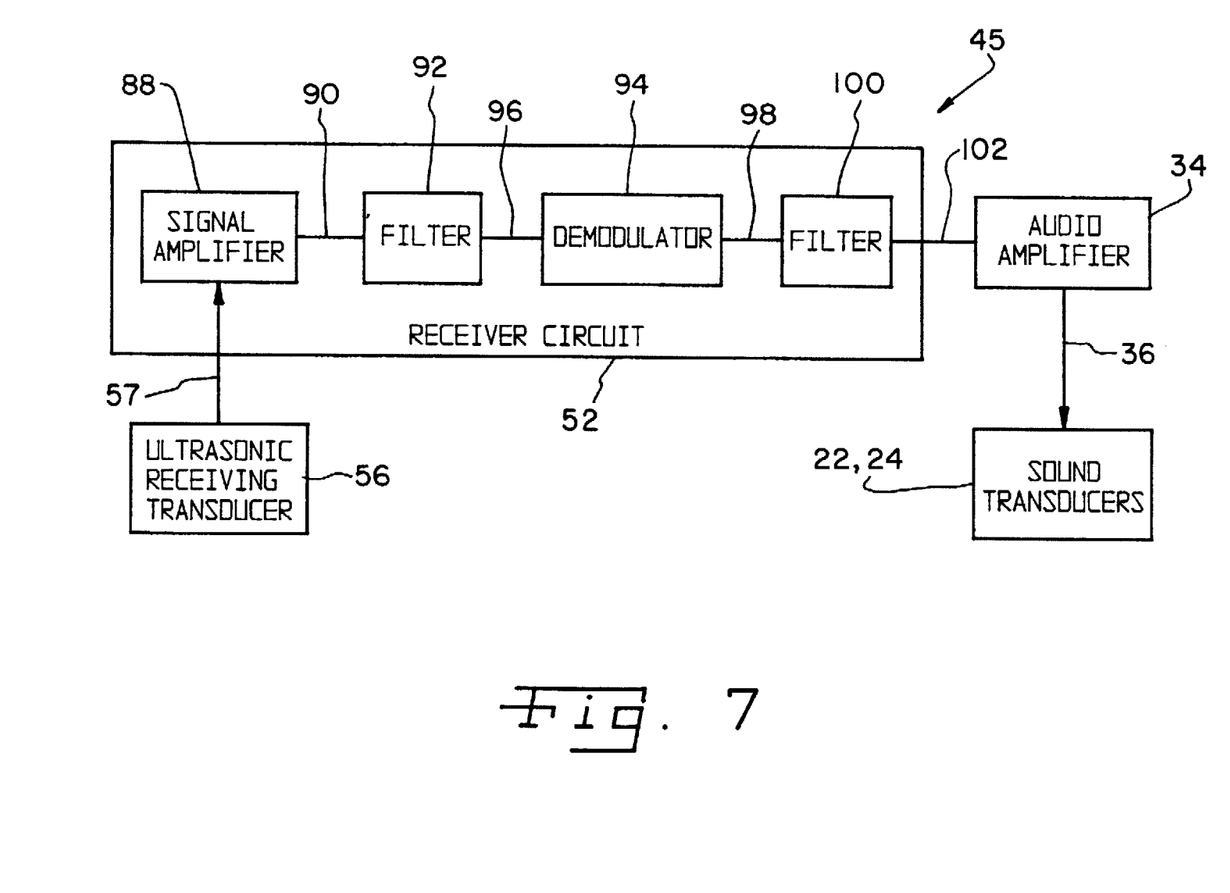
FIG. 7 is a schematic illustration detailing the receiver circuit shown in FIG. 1.

Referring now to FIG. 7, receiver circuit 52 (FIG. 1) is shown in greater detail. Receiver circuit 52 receives signals from ultrasonic receiving transducer 56 representing ultrasonic sound via line 57. Signals received via line 57 are passed to a signal amplifier 88 where the signal undergoes a gain in power necessary for a satisfactory signal to noise ratio. Signal amplifier 88 outputs the amplified signals via line 90 to a filter 92. Filter 92 is preferably in the form of a narrow, band pass filter which rejects particular channels, radio frequencies and/or ultrasonic sounds. A demodulator 94 receives the filtered signals via line 96 and demodulates the ultrasonic signals to audio signals. The resultant signals are then outputted via line 98 to a low pass filter 100 having an approximate cutoff frequency of 3,000 to 5,000 Hz. Low pass filter 100 includes components and a construction similar to audio crossover circuits. Audio amplifier 34 (FIGS. 1 and 7) receives the filtered signals via line 102 and transmits the amplified signals to sound transducers 22, 24 via line 36.

Figure 8:
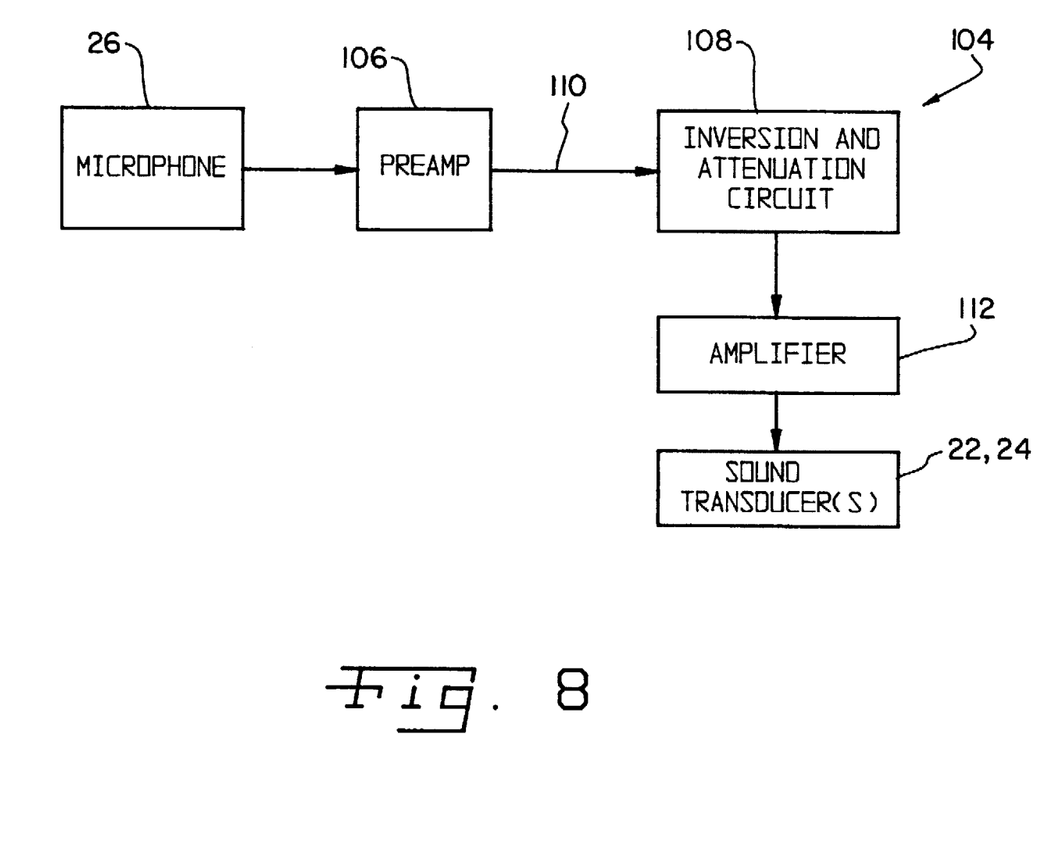
FIG. 8 is a schematic illustration detailing an embodiment of a noise cancellation circuit of the present invention.

Referring to FIG. 8, a noise cancellation circuit 104 is shown. Noise cancellation circuit 104 may optionally be disposed within and form a part of transceiver assembly 28. Sound which is considered noise emanated from the air regulator or other equipment reaches microphone 26 in scuba mouthpiece 60. Output from microphone 26 is carried to transceiver assembly 28 where it is split to transmitter circuit 44 (FIG. 3) and noise cancellation circuit 104. The signal received from microphone 26 is amplified in a preamplifier 106 to a signal having an intensity sufficient for inversion and attenuation circuit 108. Inversion and attenuation circuit 108 receives the amplified signals via line 110. Inversion and attenuation circuit 108 utilizes comparator and inversion amplifiers, and then subsequently attenuates the resultant signal such that when it reaches sound transducers 22, 24 or another separate sound transducer or speaker, after being amplified by an amplifier 112, the signal is 180 degrees out of phase and of similar amplitude to that of the initial noise sound. The resulting attenuation of the noise provides the scuba diver with a quieter diving environment and improves the communication sound fidelity and clarity. Noise cancellation circuit 104 is switched OFF during a transmission in order to avoid attenuating the sender's voice sound.

Figure 9:
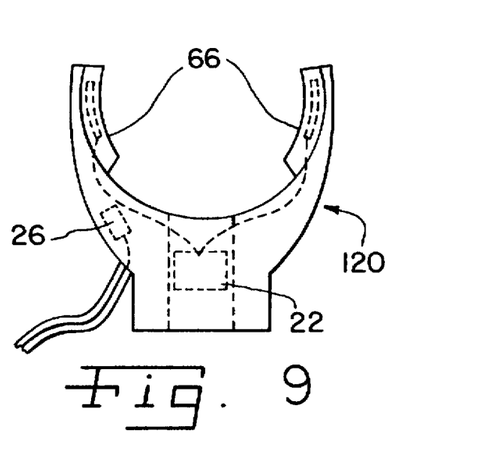
FIG. 9 illustrates a top view of another embodiment of the present invention, having one sound transducer and one microphone.
Figure 10:
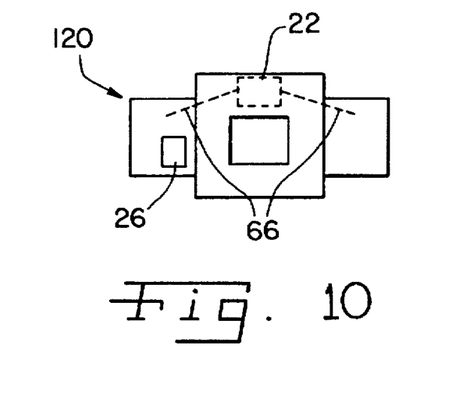
FIG. 10 is a front view of the embodiment shown in FIG. 9.

FIGS. 9 and 10 illustrate top and front views, respectively, of an alternative embodiment of a mouthpiece 120 which has a single sound transducer 22 that transmits sound through conducting strips of material 66 to both sides of the mouth. A separate microphone 26 is embedded within mouthpiece 120 and receives sound when the user speaks.

Figure 11:
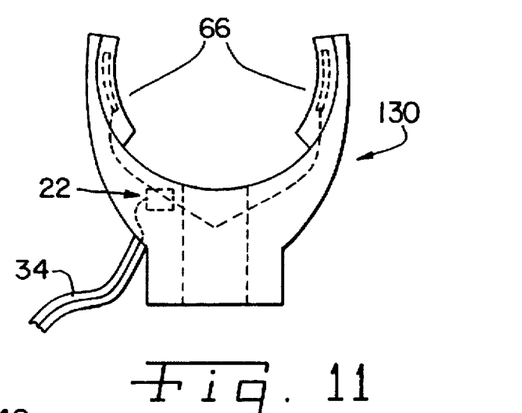
FIG. 11 illustrates a top view of another embodiment of the present invention, having a single sound transducer to receive and transmit sound.

FIG. 11 shows an alternative embodiment of a mouthpiece 130 which has a single sound transducer 22 which transmits sound to both sides of the mouth through sound conducting strips of material 66, and also acts to receive sound, i.e., acts as a microphone.

Figure 12:
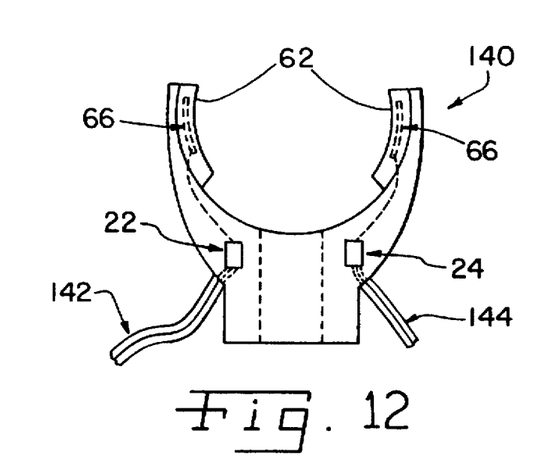
FIG. 12 illustrates a top view of another embodiment of the present invention, having two sound transducers which independently receive and transmit sound for stereophonic communication.

FIG. 12 shows an alternative embodiment of a mouthpiece 140 having independent sound transducers 22, 24 on each side of the mouth. Sound transducers 22, 24 are connected to sound conducting members 66. Sound transducers 22, 24 are wired independently via wire bundles 142, 144 to transceiver assembly 28, and may be independently excited from two different ultrasonic receiver transducers 56 placed on the right and left side of the scuba diver with associated independent signal processing circuitry. Independent excitation of transducers 22, 24 provides binaural (i.e., stereophonic) sound for directional sensing ability underwater. This is useful when searching for underwater objects that are setup to emit ultrasonic waves, such as in an echo-search-ranging system.

Figure 13:
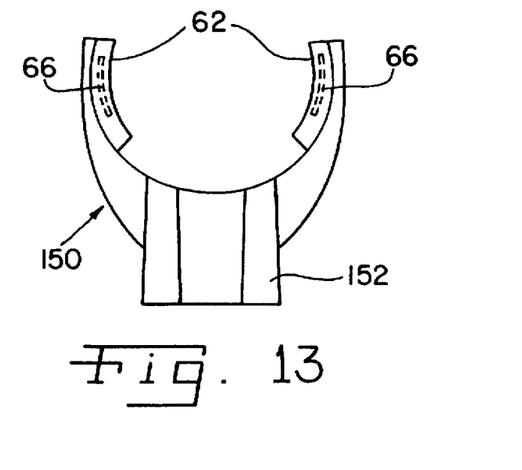
FIG. 13 illustrates a top view of another embodiment of the present invention, which allows for partial closure of the front air passage in order to enunciate certain consonants.
Figure 14:
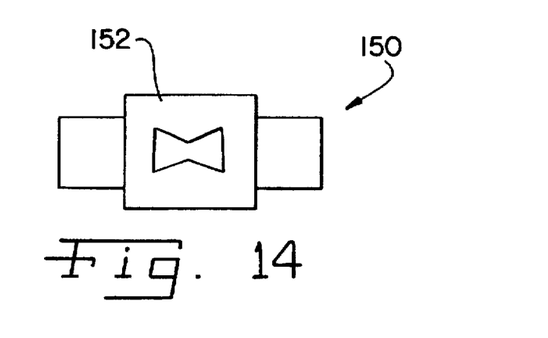
FIG. 14 is a front view of the embodiment shown in FIG. 13.

FIGS. 13 and 14 illustrate another embodiment of a mouthpiece 150 which allows for partial closure of the front part of the mouthpiece, in order to permit the enunciation of consonants which require lip closure. That is, certain consonants cannot be pronounced without closing the lips and therefore are not pronounced with the presence of an oral mouthpiece which protrudes from the mouth. This however is not a large problem as the diver will quickly adapt their speech to be intelligible to the receiving party. Additionally, the receiving swimmer can generally comprehend the voice sounds without the articulation of the aforementioned consonants. Alternatively, with the embodiment shown in FIGS. 13 and 14, an area 152 is formed from a different material than the remainder of mouthpiece 150. Similarly, mouthpiece 150 can be formed with a particular construction allowing at least partial closure of the front part thereof (not shown).

Figure 15:
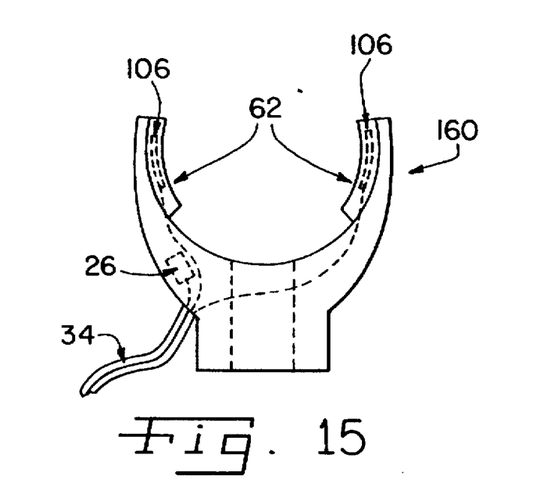
FIG. 15 illustrates a top view of another embodiment of the present invention.

FIG. 15 shows another embodiment of a mouthpiece 160 having sound transducers 106 cast into biteplate 62, rather than sound conducting strips 66 (FIGS. 2 and 3) in biteplate 62 connected to the previously mentioned sound transducers 22, 24. A microphone 26 is also embedded within mouthpiece 160.

Figure 16:
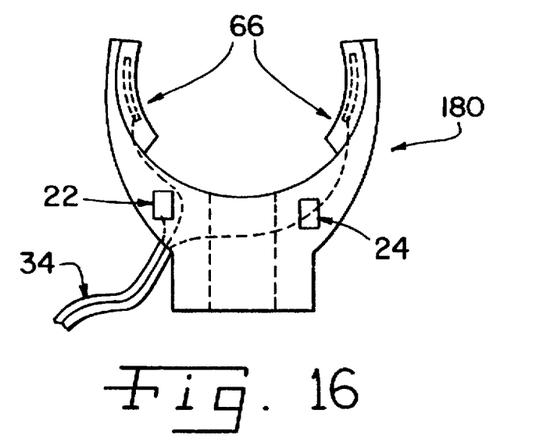
FIG. 16 illustrates a top view of another embodiment of the present invention, having two sound transducers which each receive and transmit sound.

FIG. 16 shows an alternative embodiment of a mouthpiece 180 similar to FIGS. 2 and 3, but additionally utilizing one or both sound transducers 22, 24 as a microphone. The embodiment shown in FIG. 16 therefore does not include a microphone 26.

Figure 17:
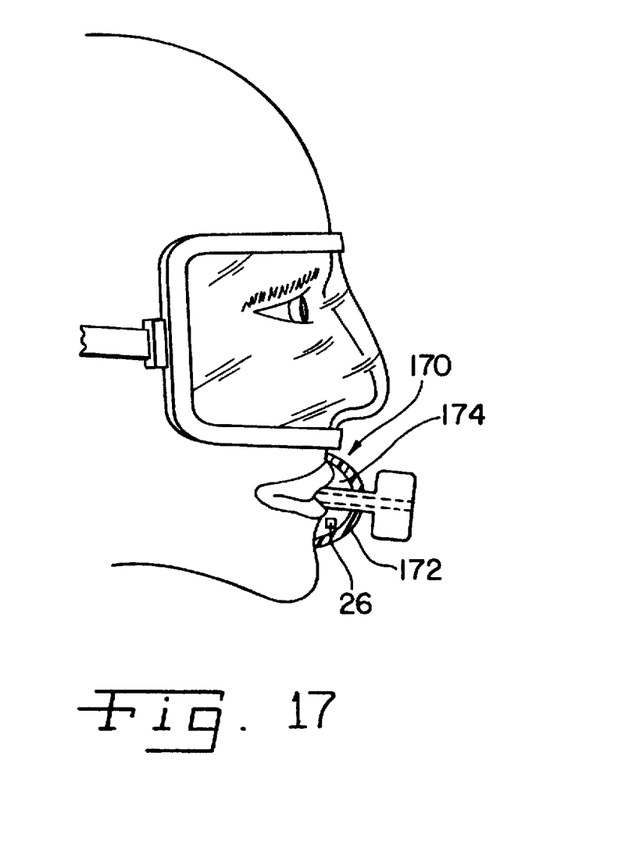
FIG. 17 is a side view of another embodiment of the present invention.

FIG. 17 shows another embodiment of a mouthpiece 170 which provides further speech enhancements, if desired. An enlarged piece 172 is fashioned to cover the lips and provide an air space 174. A microphone 26 is located in air space 174 between the diver's mouth and the second stage regulator (not shown).

The operation of the invention will now be discussed briefly with particular reference to the embodiment of communication system 20 and mouthpiece 60 shown in FIGS. 1–3. A free swimmer suits up with the scuba diving gear as usual. Before entering the water, a power switch (not shown) is turned ON which activates communication system 20 and powers receiver circuit 52 and VOX switch 38 to the ON state. Alternatively, a water sensor activation switch may be utilized which provides automatic power ON and OFF of communication system 20. The channel selector switch (not shown) is configured to a desired channel such that the swimmer is in communication with all other divers on that channel who are in the immediate vicinity. Once this procedure is completed, the diver enters the water as normal. At this time, the diver is able to hear through tooth and bone conduction all ultrasonic signals which are received by communication system 20. Under normal usage, divers who wish to communicate with one another select a common channel over which to communicate, and dive normally. When a diver speaks, VOX circuit 38 switches transmitter circuit 44 to the ON state. Sound transducers 22, 24 and/or microphone 26 transmit signals to transceiver assembly 28, wherein the signals are modulated electronically, amplified and transmitted to ultrasonic transmitter transducer 48, as described in detail above. Ultrasonic transmitter transducer 48 transmits ultrasonic signals omnidirectionally in the water medium, whereby the signals are received by other divers. The transmitted signals are received by all divers in range who are tuned to the same frequency, whereby the signals are received by their communication systems 20 by the antenna or receiving ultrasonic transducer, amplified, demodulated to audible frequencies, amplified and reproduced by sound transducers 22, 24 in mouthpiece 60. The resultant sound is thereby heard by the receiving divers. This process can be carried out without the need for divers pressing buttons or making adjustments during diving. Therefore, the communication system 20 does not contribute encumbrances to the diving experience. This is especially useful for those engaging in commercial or military usage where the hands are kept available for other uses. Because the unit is self contained and does not require the use of hands for operation, the diver is free to do that which he or she would do without the system. The difference is that the diver is in voice communication with a diving partner or partners or with a receiving/transmitting unit.

Referring now to FIGS. 18–21, conjunctively, another embodiment of a mouthpiece 200 of the present invention is shown. Mouthpiece 200 generally includes a body 202, sound transducer 204 and sound conducting member 206. Sound transducer 204 generally parallels sound transducers 22, 24 and/or 26 described above; and sound conducting member 206 generally parallels sound conducting members 66 described above.

Figures 18, 19, 20:
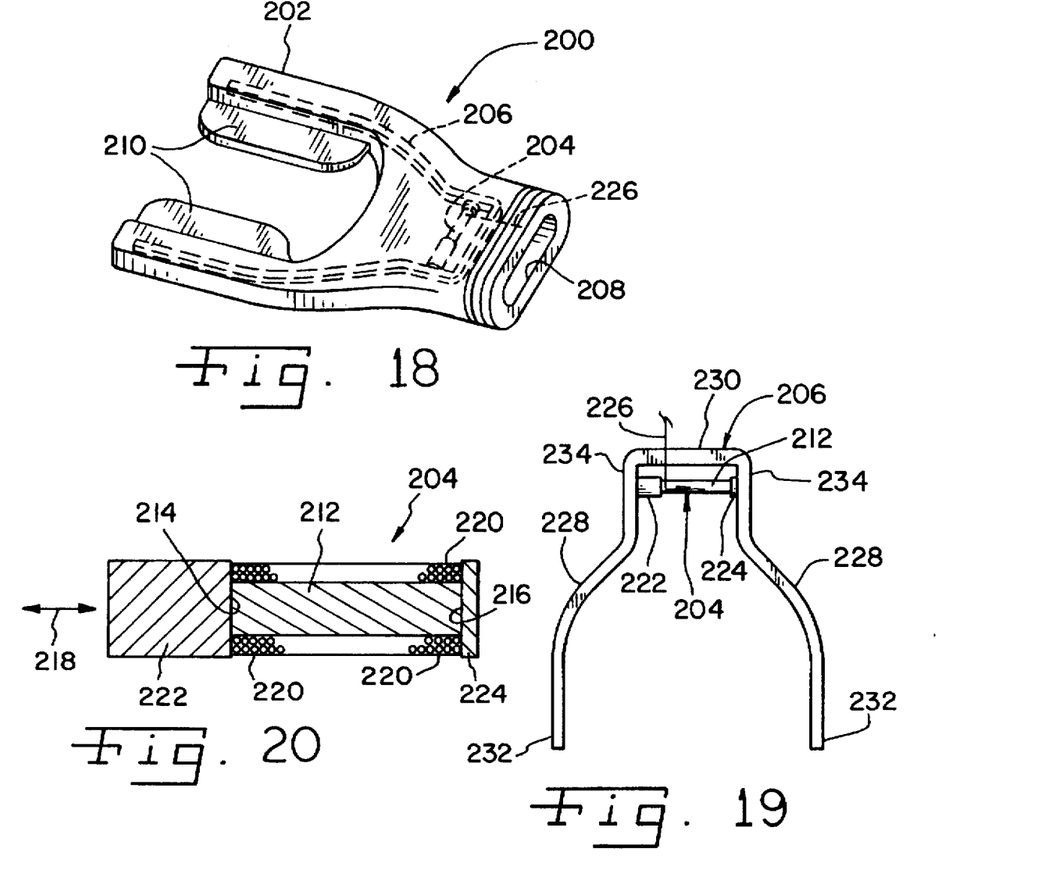
FIG. 18 is a perspective view of another embodiment of a mouthpiece of the present invention.
FIG. 19 is a plan view of the sound transducer and sound conducting member shown in FIG. 18.
FIG. 20 is a side, sectional view of the sound transducer shown in FIGS. 18 and 19.

Body 202 is typically constructed of a polymeric compound, and includes an air channel 208 which is attachable to a source of air (not shown), such as an air supply tank worn by a scuba diver. Body 202 is generally U-shaped and includes a pair of biteplates 210 which are adapted for being disposed between and engaged by the teeth of the diver. Biteplates 210 are preferably constructed from a same or similar polymeric material as the remaining portion of body 202, and are effective to conduct sound therethrough.

Sound transducer 204 in the embodiment of mouthpiece 200 shown in FIGS. 18–21 is a magnetostrictive-type sound transducer. More particularly, sound transducer 204 includes a magnetostrictive element in the form of a magnetostrictive rod 212 having opposing ends 214 and 216. Magnetostrictive rod 212 is expandable and contractible in an axial direction (represented by arrow 218) in the presence of a magnetic field. To effect the magnetic field, a wire coil 220 is wrapped around magnetostrictive rod 212, and a pair of disc-shaped permanent magnets 222, 224 are connected to respective ends 214, 216 of magnetostrictive rod 212. It will be appreciated that only a portion of coil 220 is shown for purposed of brevity. Passing a variable electrical current through coil 220 produces a magnetic field resulting in expansion or contraction of magnetostrictive rod 212. An electrical conductor 226 (FIGS. 18 and 19) is connected to and extends from coil 220 and may be connected, e.g., to transceiver assembly 28 shown in FIG. 1.

Figure 21:
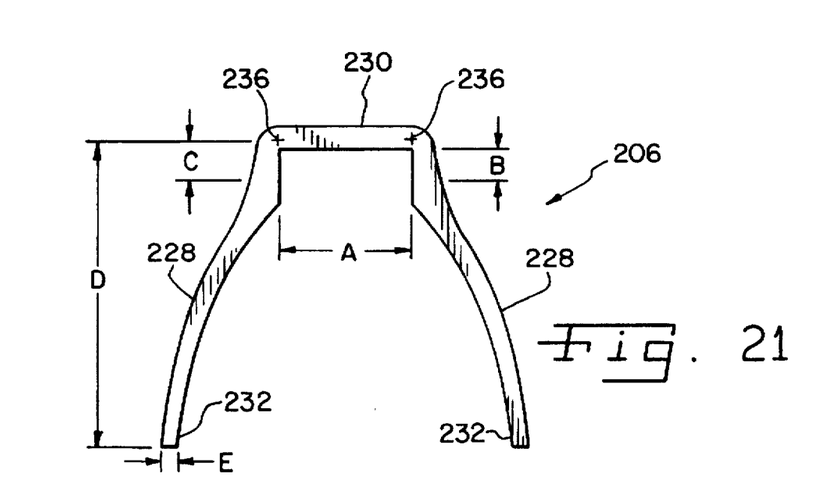
FIG. 21 is a plan view illustrating in greater detail the generally U-shaped sound conducting member shown in FIGS. 18 and 19.

Sound conducting member 206 is in the form of a generally U-shaped sound conducting member which is embedded within body 202; Sound conducting member 206 includes a pair of arms 228 and an interconnecting portion 230. Each arm 228 has a movable distal end 232 and a corresponding fixed end 234. Fixed ends 234 are connected together via interconnecting portion 230.

Sound conducting member 206 is connected to magnetostrictive rod 212 via permanent magnets 222, 224 at locations between respective movable distal ends 232 and fixed ends 234 of arms 228. Referring more specifically to FIGS. 19 and 21, conjunctively, sound transducer 204 is engaged with and connected to each of arms 228 at locations relatively close to interconnecting portion 230. As shown in FIG. 19, sound conducting member 206 extends substantially parallel to interconnecting portion 230 and exerts opposite axial forces on arms 228 in respective directions which are substantially perpendicular to arms 228. Axial expansion and contraction of sound conductor 206 causes each of arms 228 to pivot slightly about pivot points 236. Of course, interconnecting portion 230 may be sized, shaped or configured such that the pivot point for each of arms 228 is located at the midpoint of interconnecting portion 230 and/or evenly distributed across interconnecting portion 230.

In the particular embodiment of sound conducting member 206 shown in FIG. 21, a distance A between arms 228 at the points of connection with sound transducer 204 is approximately 0.010 inch less than the overall assembled length of sound transducer 204. This ensures a slight axially compressive preload on sound transducer 204, which has been found to eliminate noise during operation. Dimension B represents the distance between interconnecting portion 230 and the longitudinal axis of sound transducer 204. Dimension B is preferably selected to be 0.050 inch greater than the radius of sound transducer 204, and thereby provides a slight clearance between sound transducer 204 and interconnecting portion 230. Dimensions C and D are used to locate the longitudinal axis of sound transducer 204 relative to pivot points 236 and distal ends 232. Dimensions C and D affect the ratio between the amplitude of displacement of the sound transducer and the amplitude of the vibrational displacement at distal end 232. In the particular embodiment shown, dimension C is approximately 0.150 inch, and dimension D is approximately 1.750 inch.

With a sound conducting member 206 configured as shown in FIG. 21, and utilizing a sound transducer 204 having a magnetostrictive rod with a 0.8 millimeter (mm) length and a strain rate of approximately 1000 parts per million, sound transducer 204 expands and contracts in an axial direction approximately 0.0008 centimeter (cm). A lever ratio of approximately 12:1 is realized using the configuration shown in FIG. 21, resulting in an amplitude of displacement at distal ends 232 of arms 228 of approximately 0.0096 cm (indicated by dimension E). With a similarly constructed sound conducting member 206 having a sound transducer with a different stain rate or a different lever ratio, it is also possible to effect different amplitudes of vibration at distal ends 232 and thereby match the acoustic impedance of sound conducting member 206 with the bone tissue of the user. For example, it is possible to utilize a sound transducer 204 having an overall expansion and contraction of between approximately 0.0005 and 0.0015 cm, resulting in an amplitude of vibration at distal ends 232 of between approximately 0.008 and 0.010 cm, depending upon the particular lever ratio which is realized by varying the physical geometry of sound conducting member 206 and attachment points therewith to sound transducer 204.

Figure 22:
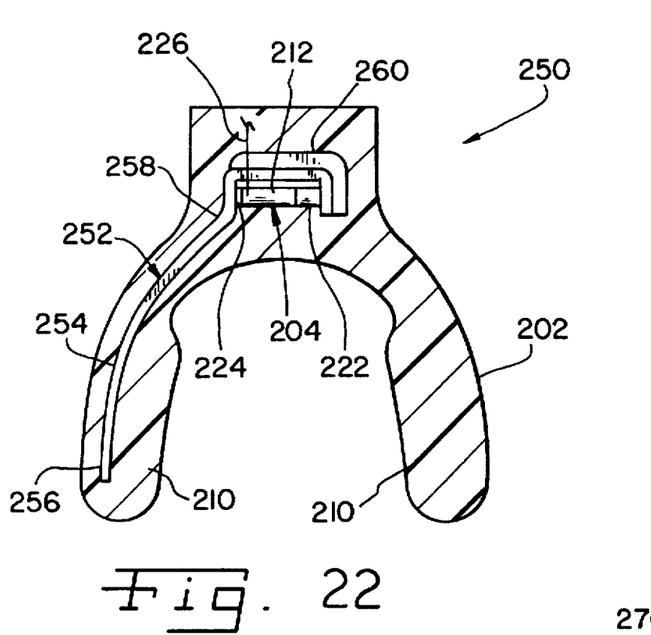
FIG. 22 is a plan view of another embodiment of a mouthpiece of the present invention, including a generally J-shaped sound conducting member with a single arm.

Referring now to FIG. 22, another embodiment of a mouthpiece 250 of the present invention is shown. Mouthpiece 250 includes a body 202 and a sound transducer 204 similar to the embodiment of mouthpiece 200 shown in FIG. 18. However, in contrast with the embodiment of mouthpiece 200 shown in FIG. 18, sound transducer 204 biases a sound conducting member 252 having only a single arm 254. As may be observed, sound conducting member 252 has a generally J-shape, and is embedded within body 202 of mouthpiece 250. Arm 254 includes a movable distal end 256 and an opposed, corresponding fixed end 258. A generally L-shaped counter weight 260 is connected to fixed end 258. Each of fixed end 258 and counter weight 260 are connected to opposing ends of magnetostrictive rod 212 of sound transducer 204. More particularly, counter weight 260 and fixed end 258 are connected to permanent magnets 222, 224, which in turn are directly attached to magnetostrictive rod 212. Counter weight 260 has a sufficient mass to ensure that axial expansion and contraction of sound transducer 204 results in movement of arm 252 and hence distal end 256. Counter weight 260 is shown as being separate from and attached to fixed end 258. However, it will be appreciated that counter weight 260 may be integrally formed with sound conducting member 252.

With the embodiments of mouthpieces 200, 250 shown in FIGS. 18–22, sound conducting members 206, 252 are embedded within the mouthpiece body 202. Sound conducting members 206 and 252 are each configured to receive audio sounds from sound transducer 204 connected therewith. Sound conducting members 206 and 252 are also configured to transmit audio sounds through an associated biteplate 210, whereby the audio sounds may be conducted to the teeth of the user.

Moreover, with each of the embodiments of mouthpieces 200, 250, sound conducting members 206 and 252 extend along side of but do not extend into biteplates 210. Placement of sound conducting members 206 and 252 outside of biteplates 210 helps to ensure that the teeth of the diver do not directly engage sound conducting members 206 or 252, thereby eliminating possible uncomfortable sensations which may occur upon contact between the teeth of the diver and the sound conducting member 206 or 232.

In the embodiment of mouthpiece 250 shown in FIG. 22, only one sound conducting member 252 is illustrated. It is also possible, however, to utilize two identical but mirrored sound conducting members 252 and associated sound transducers 204. With such a configuration, each respective sound conducting member 252 extends into and is embedded within an associated leg portion of the U-shaped body 202 such that one sound conducting member is associated with one biteplate 210 and the other sound conducting member is associated with the other biteplate 210. When electronically separated signals are conducted into the two separate transducer and sound conducting member assemblies, a corresponding separate vibration emanates from each of the two sound conducting members and subsequently into the left and right sides of the mouth. Because of the relative locations of the right side of the mouth to the right ear cochlea, vibrations from the right side transducer are more pronounced with the right ear of the user than the left. The same operational characteristics also apply to the sound conducting member associated with the left biteplate.

Alternatively, the phase of the two signals applied to the separate sound conducting members 252 providing binaural hearing may be modified and transmitted to the separate sound transducers such that constructive and destructive interference points may be established in varying places in the human skull. This results in a sound to the user with a distinct apparent directional source. It is thus possible to synthetically generate a directionalized signal using such a binaural configuration.

Figure 23:
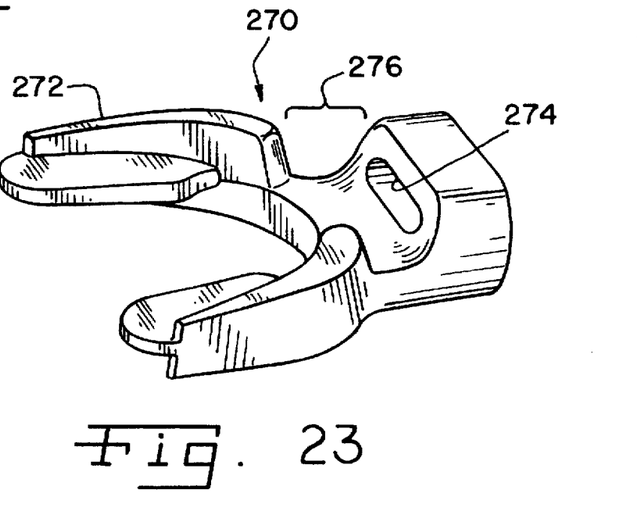
FIG. 23 is a perspective view of another embodiment of a mouthpiece of the present invention.

FIG. 23 illustrates another embodiment of a mouthpiece 270 of the present invention. Mouthpiece 270 includes a sound transducer and sound conducting member configuration of the present invention, such as sound transducer 204 and sound conducting member 206 shown in FIG. 18, embedded therein (not shown). Mouthpiece 270 includes a body 272 with a lip closure orifice 274 formed therein which functions as an air channel. Lip closure orifice 274 is connected to a source of air (not shown). Body 272 includes a relief cutout 276 where the lower lip of the user normally rests. Lip closure orifice 274 allows the user to move the lower lip therein during speech to momentarily close the air passage and effect the equivalent of closing the lips when pronouncing percussive consonants. This provides an improved clarity of speech with a mouthpiece placed in the mouth of the user. Percussive consonants such as M, P, B, V and F can be pronounced more clearly using a lip closure orifice 274 because of the ability to temporarily close the air passageway when the upper lip of the user is moved into lip closure orifice 274.

An application for the underwater communication device of the present invention is one-way communication. A diver can transmit voice signals to a receiving unit attached to a boat or other surface, land, or underwater unit. It is also possible for a transmitter unit to send communication signals to a diver.

The present invention also has application to all sectors of underwater swimming, such as commercial, military and recreational applications. Communication system 20 is intended to be connected to an existing diving apparatus, can be fitted to any type or brand of modern diving equipment. It provides clear and easily understood voice communication between 2 or more divers, while having an effective range of approximately 500 meters, and aside from providing sound communication is basically transparent and unobtrusive to the diver. Communication system 20 of the present invention does not require the use of a hood or any other non-standard recreational scuba diving apparatus or device.

The communication system of the present invention is shown in the drawings for use as an underwater communication system. However, it is also to be understood that the mouthpiece of the present invention including sound transducers and/or microphones therein may be used for land-based applications. For example, certain sporting activities such as football, boxing, soccer, basketball, wrestling and the like may require the use of a mouthpiece. Using the sound transducers and mouthpiece of the present invention, it is likewise possible to transmit audio sound via bone conduction to a user of a mouthpiece. If the mouthpiece of the present invention is used for land-based applications, it will be appreciated that it may be desirable to make certain modifications to the circuitry used to carry out the present invention. For example, the ultrasonic frequency which is used to communicate between two or more individuals under water may be replaced with an RF or other frequency for land-based applications. Of course, the present invention may also be used for other applications apparent to those skilled in the art.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A scuba diving mouthpiece for supplying air to a diver, said mouthpiece attachable to a source of air, said mouthpiece comprising:

a mouth engageable body including at least one biteplate, each said biteplate adapted for being disposed between and engageable by the teeth of the diver;

a sound transducer associated with said body, said sound transducer including a magnetostrictive element with opposing ends, said magnetostrictive element being expandable and contractible in an axial direction in a presence of a magnetic field; and a sound conducting member including a movable distal end and an opposing fixed end, said sound conducting member being operatively connected with one of said ends of said magnetostrictive element at a location between said distal end and said fixed end, said sound conducting member being embedded within said body and configured to receive audio sounds from said connected sound transducer, said sound conducting member also being configured to transmit audio sounds through at least one said biteplate, whereby said audio sounds may be conducted to the teeth of the diver.

2. The scuba diving mouthpiece of claim 1, wherein said sound conducting member comprises a substantially U-shaped sound conducting member having a pair of arms and an interconnecting portion, each said arm having a movable distal end with a corresponding fixed end, said interconnecting portion connecting said fixed ends together, each said arm connected to an opposing end of said magnetostrictive element.

3. The scuba diving mouthpiece of claim 2, wherein said sound transducer further includes a pair of disks with each said disk being attached to a respective said end of said magnetostrictive element, each said arm being engaged with a corresponding said disk and connected to said magnetostrictive element by way of said corresponding disk.

4. The scuba diving mouthpiece of claim 3, wherein each said disk comprises a permanent magnet.

5. The scuba diving mouthpiece of claim 1, wherein said sound conducting member is connected to said magnetostrictive element at a predetermined distance from said fixed end, said predetermined distance affecting an amplitude of vibration of said movable distal end upon occurrence of said expansion and contraction of said magnetostrictive element.

6. The scuba diving mouthpiece of claim 5, wherein said magnetostrictive element has an overall expansion and contraction of between approximately 0.0005 and 0.0015 centimeters, and wherein said amplitude of vibration at said movable distal end is between approximately 0.008 and 0.010 centimeters.

7. The scuba diving mouthpiece of claim 6, wherein said magnetostrictive element has an overall expansion and contraction of approximately 0.0008 centimeters, and wherein said amplitude of vibration at said movable distal end is approximately 0.0096 centimeters.

8. The scuba diving mouthpiece of claim 5, wherein said fixed end defines a pivot point, said arm being connected to said magnetostrictive element at a distance of approximately 0.15 inch from said pivot point, and said arm having an overall length of approximately 1.75 inch from said pivot point.

9. The scuba diving mouthpiece of claim 1, wherein said sound conducting member comprises a substantially J-shaped sound conducting member including an arm and a generally L-shaped counterweight, said arm having a movable distal end and a corresponding fixed end, said counterweight being connected to said fixed end of said arm, said arm and said counterweight being connected to opposing ends of said magnetostrictive element.

10. The scuba diving mouthpiece of claim 1, wherein said sound transducer further includes a pair of disk-shaped magnets with each said magnet being attached to a respective said end of said magnetostrictive element, each said arm being engaged with a corresponding said magnet and connected to said magnetostrictive element by way of said corresponding magnet.

11. A communication system, comprising:

a transceiver adapted for receiving and transmitting signals corresponding to sounds; and a mouthpiece including a body, a sound transducer and a sound conducting member, said sound transducer being embedded within said body, said sound transducer including a magnetostrictive element with opposing ends, said magnetostrictive element being expandable and contractible in an axial direction in a presence of a magnetic field, said sound conducting member including a movable distal end and an opposing fixed end, said sound conducting member being operatively connected with one of said ends of said magnetostrictive element at a location between said distal end and said fixed end, said sound conducting member being embedded within said body and configured to receive audio sounds from said connected sound transducer, said sound conducting member also being configured to transmit audio sounds through at least one said biteplate, whereby said audio sounds may be conducted to the teeth of the diver.

12. A mouthpiece which may be positioned within the mouth of a user, said mouthpiece comprising:

a U-shaped portion including at least one biteplate, said biteplate adapted for being disposed between and engageable by the teeth of the user;

at least one sound transducer associated with said U-shaped portion, each said sound transducer including a magnetostrictive element with opposing ends, said magnetostrictive element being expandable and contractible in an axial direction in a presence of a magnetic field; and a sound conducting member including a movable distal end and an opposing fixed end, said sound conducting member being operatively connected with one of said ends of said magnetostrictive element at a location between said distal end and said fixed end, said sound conducting member being embedded within said U-shaped portion and configured to receive audio sounds from said connected sound transducer, said sound conducting member also being configured to transmit audio sounds through at least one said biteplate, whereby said audio sounds may be conducted to the teeth of the diver.

\* \* \* \* \*

UNITED STATES PATENT AND TRADEMARK OFFICE
CERTIFICATE OF CORRECTION

PATENT NO. : 5,706,251
DATED : January 6, 1998
INVENTOR(S) : David F. May

It is certified that error appears in the above-identified patent and that said Letters Patent is hereby corrected as shown below:

TITLE PAGE , item [56]

Line 18, delete "Hinter et al" and substitute --Hunter, et al-- therefor.

Signed and Sealed this

Fifth Day of May, 1998

Attest:

BRUCE LEHMAN

Attesting Officer

Commissioner of Patents and Trademarks